(12) United States Patent  
Chang

(10) Patent No.: US 8,786,408 B2
(45) Date of Patent: Jul. 22, 2014

(54) METHOD FOR SEARCHING A PLURALITY OF RFID TAGS AND APPARATUS

(75) Inventor: Chiung Hung Chang, Hsinchu Hsien (TW)

(73) Assignee: MStar Semiconductor, Inc. (TW)

( * ) Notice: Subject to any disclaimer, the term of this patent is extended or adjusted under 35 U.S.C. 154(b) by 698 days.

(21) Appl. No.: 12/651,778

(22) Filed: Jan. 4, 2010

(65) Prior Publication Data

US 2010/0171599 A1 Jul. 8, 2010

(30) Foreign Application Priority Data

Jan. 7, 2009 (TW) .............................. 98100332 A

(51) Int. Cl.
*H04Q 5/22* (2006.01)
*G06K 7/00* (2006.01)
*G06K 7/10* (2006.01)

(52) U.S. Cl.
CPC .... *G06K 7/0008* (2013.01); *H04Q 2213/13003* (2013.01); *G06K 7/10019* (2013.01)
USPC ...................... 340/10.2; 340/10.42; 340/10.1

(58) Field of Classification Search
USPC ................................................. 340/10.2, 10.4
See application file for complete search history.

(56) References Cited

U.S. PATENT DOCUMENTS

| | | | |
|---|---|---|---|
| 6,265,962 B1* | 7/2001 | Black et al. ................... | 340/10.2 |
| 6,756,880 B2* | 6/2004 | Hartmann ................... | 340/10.42 |
| 7,075,412 B1* | 7/2006 | Reynolds et al. ............ | 340/10.2 |
| 7,315,522 B2* | 1/2008 | Wood, Jr. ....................... | 370/312 |
| 7,502,365 B2* | 3/2009 | Yamagata ..................... | 370/366 |
| 7,626,503 B2* | 12/2009 | Choi et al. .................. | 340/572.1 |
| 7,760,677 B2* | 7/2010 | Wood, Jr. ....................... | 370/312 |
| 7,920,046 B1* | 4/2011 | Aiouaz et al. ................ | 340/3.63 |
| RE42,344 E * | 5/2011 | Wood et al. ................... | 370/329 |
| 8,102,243 B2* | 1/2012 | Horne et al. ................. | 340/10.1 |
| 8,497,763 B2* | 7/2013 | Sawada et al. ............... | 340/10.1 |
| 8,653,946 B2* | 2/2014 | Bae et al. ..................... | 340/10.2 |
| 8,717,147 B2* | 5/2014 | Bae et al. ..................... | 340/10.3 |
| 2003/0137403 A1* | 7/2003 | Carrender et al. ........... | 340/10.4 |
| 2005/0280507 A1* | 12/2005 | Diorio et al. ................. | 340/10.1 |

(Continued)

FOREIGN PATENT DOCUMENTS

CN 1606031 A 4/2005

OTHER PUBLICATIONS

First Examination Opinion issued by State Intellectual Property Office of China on Sep. 26, 2011 regarding Chinese Patent Application No. 200910005568.1 (Document Serial No. 2011092100612960).

*Primary Examiner* — Jennifer Mehmood
*Assistant Examiner* — Rufus Point
(74) *Attorney, Agent, or Firm* — Han IP Corporation

(57) ABSTRACT

A method for searching RFID tags and an RFID reader thereof are provided. Each of a plurality of RFID tags awaiting to be accessed has a UID composed of a plurality of bits. The method comprises dividing the plurality of bits of the UID into groups to generate a plurality of groups; selecting a first group and a first value for the first group; obtaining a search result according to a search command and the UIDs of the RFID tags; and analyzing the search result to determine whether at least one RFID tag corresponds to the first group and the first value. Each of the groups has n bits, where n is a positive integer greater than or equal to 1.

19 Claims, 3 Drawing Sheets

(56) References Cited

U.S. PATENT DOCUMENTS

| | | | |
|---|---|---|---|
| 2006/0261956 A1* | 11/2006 | Sundstrom et al. | 340/572.2 |
| 2007/0118426 A1* | 5/2007 | Barnes, Jr. | 705/14 |
| 2008/0106382 A1* | 5/2008 | Choi et al. | 340/10.2 |
| 2008/0111661 A1* | 5/2008 | Lin et al. | 340/10.1 |
| 2009/0115576 A1* | 5/2009 | Schuessler | 340/10.1 |

* cited by examiner

| search group: | 8 | 7 | 6 | 5 | 4 | 3 | 2 | 1 |
|---|---|---|---|---|---|---|---|---|
| bit: | 29-32 | 25-28 | 21-24 | 17-20 | 13-16 | 9-12 | 5-8 | 1-4 |
| tag1 :UID | 5 | 2 | 4 | 3 | 4 | D | B | 3 |
| tag2 :UID | 5 | 2 | 4 | 3 | 3 | E | B | 3 |
| tag3 :UID | 5 | 2 | 4 | 7 | 3 | D | B | 3 |

METHOD FOR SEARCHING A PLURALITY OF RFID TAGS AND APPARATUS

CROSS REFERENCE TO RELATED PATENT APPLICATION

This patent application is based on Taiwan, R.O.C. patent application No. 098100332 filed on Jan. 7, 2009.

TECHNICAL FIELD

The present disclosure relates to radio frequency identification (RFID), and more particularly, to a method for searching a plurality of RFID tags via unique identifiers (UIDs) of the RFID tags and apparatus thereof.

BACKGROUND OF RELATED ART

In most RFID systems, an interrogator, such as an RFID reader, searches all RFID tags within an effective range to perform further operations. FIG. 1 is a flow chart of a conventional method of an interrogator searching RFID tags. The flow begins with Step 10. In Step 12, a protocol applied to the method is defined. In Step 14, it is determined whether there are a plurality of RFID tags be searched simultaneously. In Step 16, when the answer is no, for example, when there is only one RFID tag to be searched, a UID of the RFID tag is directly stored. In Step 18, when there are multiple RFID tags to be searched simultaneously, a search mechanism is implemented for searching. In Step 20, after the respective UIDs of the plurality of RFID tags are identified, the UIDs of the plurality of RFID tags are respectively stored. The flow ends with Step 22. Most RFID technologies apply the foregoing method for searching. However, a certain method is only applicable to one protocol such that the method offers little user flexibility. Therefore, there exists a need to design a search method applicable to various protocols and apparatus thereof, thereby improving search efficiency.

SUMMARY

One object of the present disclosure is to provide a search method applicable to various protocols and apparatus thereof, which divides UIDs of RFID tags into groups and searches according to the groups, thereby improving search efficiency.

A method for searching a plurality of RFID tags is provided according to an embodiment of the present disclosure. Each of the RFID tags has a UID. The method comprises dividing the UID into a plurality of search groups each having n bits and content from 0 to $2^n-1$; and defining the content of one of the search groups and interrogating the RFID tags according to a predetermined sequence via an RFID reader, wherein the RFID tags selectively reply to the RFID reader according to 1 to n−1 bits of each of the UIDs, and recording the current content of the search group when a certain RFID tag replies to the RFID reader.

An RFID reader is provided according to another embodiment of the present disclosure. The RFID reader searches a plurality of RFID tags each having a UID composed of a plurality of bits. The RFID reader comprises a control unit, a communication protocol processing module and an analyzing module. The control unit, by dividing the plurality of bits into groups, generates a plurality of groups each having n bits, where n is a positive integer greater than 1. The control unit selects a first group and a first value corresponding to the first group. The communication protocol processing module, coupled to the control unit, generates a search command according to the first group and the first value. The RFID reader obtains a search result according to the search command and the UIDs of the RFID tags. The analyzing module, coupled to the communication protocol module and the control unit, analyzes the search result to determine whether at least one RFID tag corresponds to the first group and the first value.

A method for searching a plurality of RFID tags is provided according to another embodiment of the present disclosure. Each of the RFID tags has a UID composed of a plurality of bits. The method comprises dividing the plurality of bits into groups to generate a plurality of groups each having n bits, where n is positive integer greater than 1; selecting a first group and a first value corresponding to the first group; generating a search command according to the first group and the first value and obtaining a search result according to the search command and the UIDs of the RFID tags; and analyzing the search result to determine whether at least one RFID tag corresponds to the first group and the first value.

An effective method applicable to various protocols and apparatus thereof is provided according to the present disclosure. In a conventional method, multiple RFID tags are searched several times to identify the UID of each of the RFID tags. According to the present disclosure, all the UIDs of the RFID tags are identified with one search procedure, thereby solving the problem of the conventional method having low search efficiency.

DETAILED DESCRIPTION OF THE PREFERRED EMBODIMENT

A method according to the present disclosure is applicable to various protocols, given that the various protocols satisfy one basic condition. That is, it is defined that, when partial content of UIDs of RFID tags is the same with content of a search group currently interrogated by an interrogator, the RFID tags matching the condition will reply to the interrogator in response with the complete UIDs. For example, the ISO 15693 and ISO 14443A protocols are compliant with such characteristic. The search method according to the present disclosure is discussed in detail in the following description.

Figure 1:
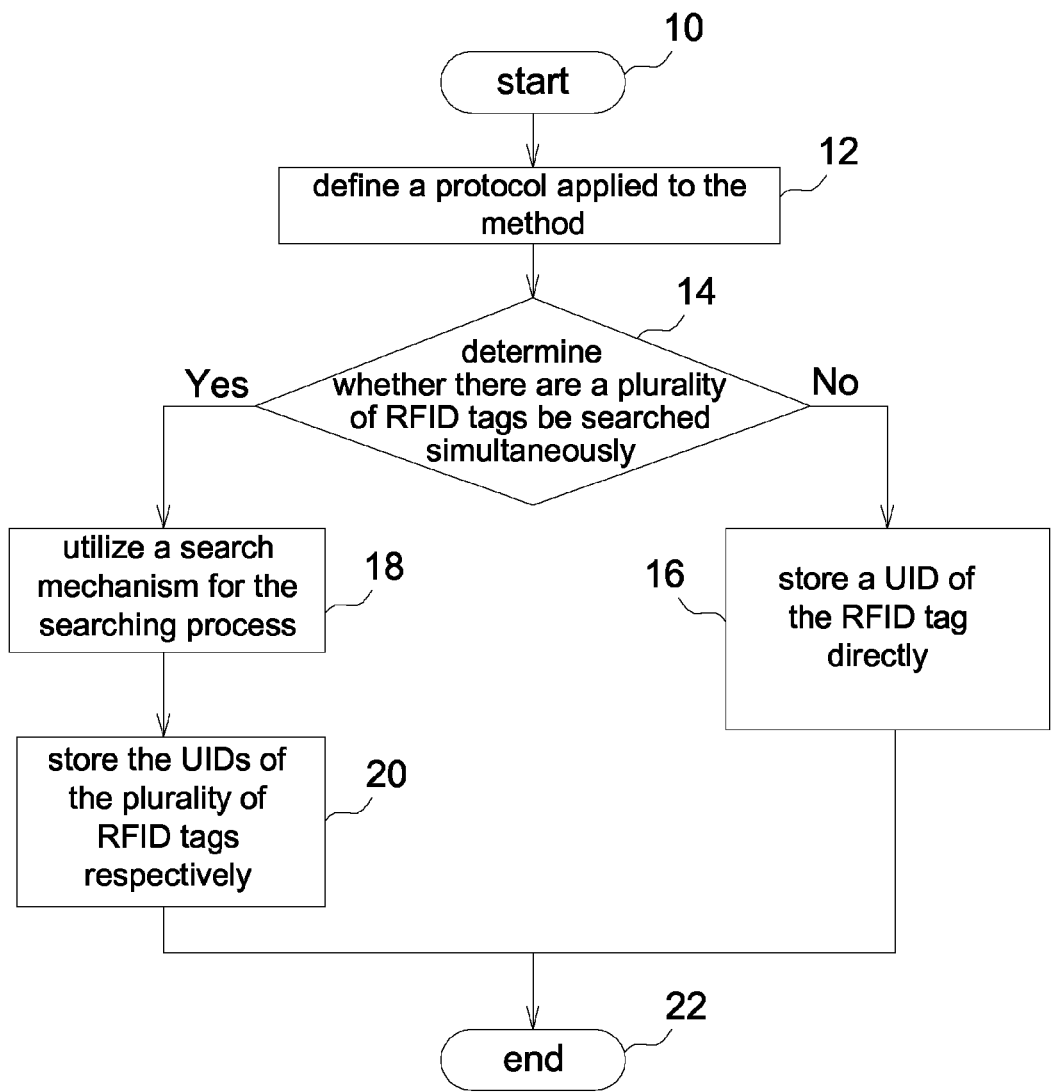
FIG. 1 is a flow chart of a conventional interrogator searching RFID tags.
Figures 2, 3:
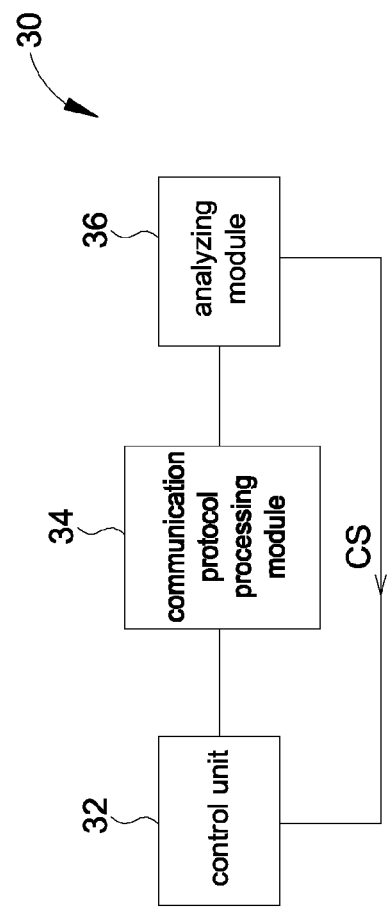
FIG. 2 is a schematic diagram of UIDs of tags 1 to 3 in accordance with an embodiment of the present disclosure.
FIG. 3 is a block diagram of an RFID reader in accordance with an embodiment of the present disclosure.

Referring to FIG. 2, in this embodiment, supposing a UID of each of the RFID tags has 32 bits and every 4 bits are regarded as a search group, the UID of each of the RFID tags is then divided into 8 groups. Take three RFID tags to be searched as an example. The UIDs of the RFID tags 1 to 3, represented in hexadecimal form, are "52434DB3", "52433EB3" and "52473 DB3", respectively. Each hexadecimal character of the codes represents 4 binary bits, i.e., the last code "3" (expressed in hexadecimal form) of the three UIDs is practically "0011" expressed in binary form. Each of the search groups has 4 bits such that values of each of the search group can range from "0" to "F" in hexadecimal form, and the values correspond to "0000" to "1111" in binary form. With respect to the 4 least significant bits (LSB), i.e., the first to the fourth bits of a search group 1 as illustrated in FIG. 2, an RFID reader defines a value and interrogates every RFID tag. More specifically, the RFID tags reply to the interrogation according to whether the 4 LSB of the search group 1 of the UIDs of the RFID tags match the defined value. For example, when the defined value is "0", the tags 1 to 3 do not reply the interrogation in this embodiment since the value "3" of the 4 LSB does not match the defined value "0". The RFID reader then changes content of the search group 1 according to a predetermined sequence, e.g., an increasing order such as changing the defined value in sequence from "1", "2" to "3" to correspondingly interrogate the RFID tags. When the RFID reader interrogates the RFID tags according to the content of "3", the tags 1 to 3 respond simultaneously to cause a collision at this point, and meanwhile the RFID reader records the value of the search group 1 as "3". The collision that represents the concurrent existence of a same defined value means that the tags cannot be distinguished from one another when only the current search group, i.e., the search group 1, is used. Consequently, the RFID reader applies more search groups for more refined search. The RFID reader then extends the search group range to a next search group according to the predetermined sequence. In this embodiment, the next search group is the search group 2, i.e., the fifth to the eighth bits, and content of the second search group is switched in sequence from "0" to "F" according to the same predetermined sequence. At this point, the value of the search group 1 remains as "3" as recorded. Therefore, the content of the RFID reader is switched in sequence from 03, 13, 23 . . . to F3. When the RFID reader interrogates the RFID tags according to the content of "B3", the tags 1 to 3 respond simultaneously to again cause a collision. The RFID reader then records the content, as "B3" of the two search groups, corresponding to the first to the eighth bits, and extends the search group range to a next search group, group 3, according to the predetermined sequence. The steps for the search group 1 and 2 are repeated for the search group 3. The RFID reader interrogates the RFID tags according to content of the search group 3, switched in sequence from 0B3, 1B3, 2B3 . . . to FB3. When the RFID reader interrogates the RFID tags according to the content of "DB3", the tags 1 and 3 respond simultaneously to again cause a collision. The RFID reader then records the content of the three search groups as "DB3" corresponding to first to the twelve bits. The foregoing steps are repeated. When the RFID reader searches the search group 4 and interrogates the RFID tags according to the content of "3" of the search group 4 and the content of "DB3" of the three search groups as recorded, the four groups (the last sixteen bits) of the tag 3 match with the content of the interrogation of the RFID reader. At this point, the tag 3 replies to the RFID reader with its complete UID, and the RFID reader then records the UID of the tag 3. The RFID reader continues to search the search group 4 by following the predetermined sequence, i.e., the RFID reader next interrogates the RFID tags according to the content of "4" of the search group 4 and the "DB3" as recorded. At this point, the tag 1, with the matching four groups (the last sixteen bits), replies to the RFID reader with its complete UID and the RFID reader records the UID. The RFID reader continues to search the search group 4 and in sequence interrogates the RFID tags according to the predetermined sequence from 5 DB3, 6 DB3, 7 DB3 . . . to FDB3. None of the tags 1 to 3 matches with the content and no reply is given to the RFID reader.

After the search group 4 has been searched, i.e., after all content (i.e., hexadecimal values from "0" to "F") of the search group 4 has been checked, the RFID reader returns to the previous search group 3 comprising the ninth to the twelfth bits. The RFID reader continues the search procedure according to the value "D" of the search group 3 as recorded, in conjunction with the values "B" and "3" of the search group 2 and 1 as recorded respectively, and continues to interrogate the RFID tags from a smallest value to the greatest value in sequence. That is, the RFID reader searches the RFID tags according to the content of "EB3" of the 3 lowest groups. The tags 2 matches with the condition. Therefore, the tag 2 replies to the RFID reader with its complete UID, and the RFID reader then records the UID.

At this point, although all the RFID tags (i.e., the RFID tags 1 to 3) have replied to the RFID reader, the RFID reader continues to interrogate until the whole interrogation flow ends since it is unaware of how many RFID tags there actually are. In other words, the RFID reader continues the interrogation, beginning with the current content of the search group 3; that is, the RFID continues the interrogation using the content of "FB3". The hexadecimal values 0 to F of the search group 3 are searched for and no reply from the RFID tags is received. Thus, the RFID reader returns to the previous search group 2 and continues to search by following the predetermined sequence according to the value recorded at the time of the collision. In the foregoing example, the value of the search group 2 is "B" when the collision happened. Therefore, the RFID reader continues to interrogate the RFID tags by following the sequence from C3, D3, E3 to F3. No reply from the RFID tags is received in this example. Therefore, the RFID reader returns to the search group 1 and searches the search group 1 with a same procedure. Similarly, no reply from the RFID tags is received in this example. At this point, for that the search group comprises the lowest bits (the first to fourth bits) and the last value "F" of the search group is also searched in sequence, the search flow ends.

It is to be noted that, in the foregoing examples, the predetermined sequence is that the values of the search groups are changed from the smallest to the greatest value (from "0 to "F" in hexadecimal form); however, it shall not be construed as limiting the search sequence. Other sequences, for example, from the greatest to the smallest value (from "F" to "0" in hexadecimal form), a sequence of 1, 3, 5, . . . , to F, or a sequence of 0, 2, 4, . . . , to E, are within the spirit and scope of appended claims. Moreover, the search groups are switched according to the foregoing sequence from the search group 1 to the search group 8. That is, the search groups are searched from the group comprising the LSB to the group comprising the most significant bits (MSB); alternatively, an opposite sequence can be followed.

FIG. 3 is a functional block diagram of an RFID reader 30 in accordance with the present disclosure. The RFID reader 30 comprises a control unit 32, a communication protocol processing module 34 and an analyzing module 36. The control unit 32 generates a plurality of search groups from a plurality of bits of a UID of an RFID tag. Each of the groups has n bits, where n is a positive integer greater than or equal to 1, such as 4 in the foregoing embodiment. The control unit selects a search group such as the search group 1 (corresponding to the lowest 4 bits of the UID) in the foregoing embodiment, and selects a first value of the search group 1. The first value is changed by following a predetermined sequence, such as changing from the smallest to the greatest value (from "0" to "F") as mentioned in the foregoing embodiment. The communication protocol processing module 34, coupled to the control unit 32, generates a search command according to the search group 1 and the first value. The RFID reader 30 obtains a search result according to the search command and the UIDs of a plurality of RFID tags. The analyzing module 36, coupled to the communication protocol processing module 34 and the control unit 32, analyzes the search result to determine whether at least one RFID tag corresponding to the search group 1 and the first value exists within an access range of the RFID reader 30.

There are three possible situations based on the search result. The first situation is that no reply is generated; the second situation is that a collision happens; and the third situation is that only one reply is generated. When the search result indicates that no reply is generated, the analyzing module 32 generates a control signal CS, and the control unit 32 changes the first value according to the control signal CS and a first predetermined sequence. For example, the first value is incremented from "0" to "F" in sequence as mentioned in the foregoing embodiment. When the content of the search group 1 is "3", the tags 1 to 3 respond simultaneously and the search result indicates that the collision happens. The analyzing module 36 records the first value which is "3" when the collision happens and generates the control signal CS. The control unit 32 selects a second group, i.e., the search group 2 corresponding to the fifth to the eighth bits of the UID, according to the control signal CS and a second predetermined sequence such as starting from the LSB to the MSB. Moreover, the control unit 32 defines a second value corresponding to the search group 2, and generates a search command with content of "03" to "F3" according to the same first predetermined sequence in conjunction with the recorded first value which is "3" in this embodiment. When the content of "B3" is searched, the three tags respond simultaneously and the analyzing module 36 detects the collision. Therefore, the analyzing module 36 records the second value "B" at this point, and generates the control signal CS to the control unit 32. The control unit 32 then switches the search group and the value according to similar steps. When reaching the fourth value "3" of the search group 4, the control unit 32 receives a reply from the tag 3 in response to the search command with the content of "3 DB3", with the search result indicating that the reply is generated and no collision happens. Accordingly, the tag 3 responds with the complete UID to the RFID reader 30, and the analyzing module 36 records the complete UID of the tag 3.

The control unit 32 continues to increment the fourth value of the search group 4 according to the foregoing predetermined sequence. When the search command has the content of "4 DB3", a reply from the tag 1 is received and no collision happens. Similarly, the tag 1 replies to the RFID reader 30 with the complete UID, and the analyzing module 36 records the complete UID of the tag 1 and selectively further communicates with the tag 1. The control unit 32 continues to change the fourth value, and the search result obtained by the communication protocol processing module 34 indicates that no reply is generated when the fourth value is "5". Therefore, the analyzing module 36 generates the control signal CS according to the search result, and the control unit 32 changes the fourth value in the predetermined sequence according to the control signal CS. In this embodiment, the next fourth value is "6". The foregoing steps are repeated. After the remaining values "6" to "F" of the fourth value are searched, the RFID reader 30 does not receive any reply. The control unit 32 then switches to the previous search group 3, and continues the search procedure according to the third value "D" as recorded. That is, the third value is changed according to the first predetermined sequence. When the third value is switched to "E", the search command with the content "EB3" receives a reply from the tag 2 and no collision happens. The tag 2 replies the complete UID to the RFID reader 30, and the analyzing module 36 records the complete UID of the tag 2 and selectively further communicates with tag 2.

At this point, although all the RFID tags have been searched, the RFID reader is unaware whether there still exist tags that have not been searched. Therefore, the third value is changed until all possible values for the third value are searched. The control unit 32 then switches to the previous search group 2 and continues with the foregoing steps. Finally, when the values represented by n bits (4 in this embodiment) of the search group 1 have been searched, the control unit 32 ends the search procedure.

The search groups have 4 bits in the foregoing embodiments; however, it shall not be construed as limiting. When the number of the bits of the search groups is changed, a value range of each of the search groups is also changed correspondingly.

Figure 4:
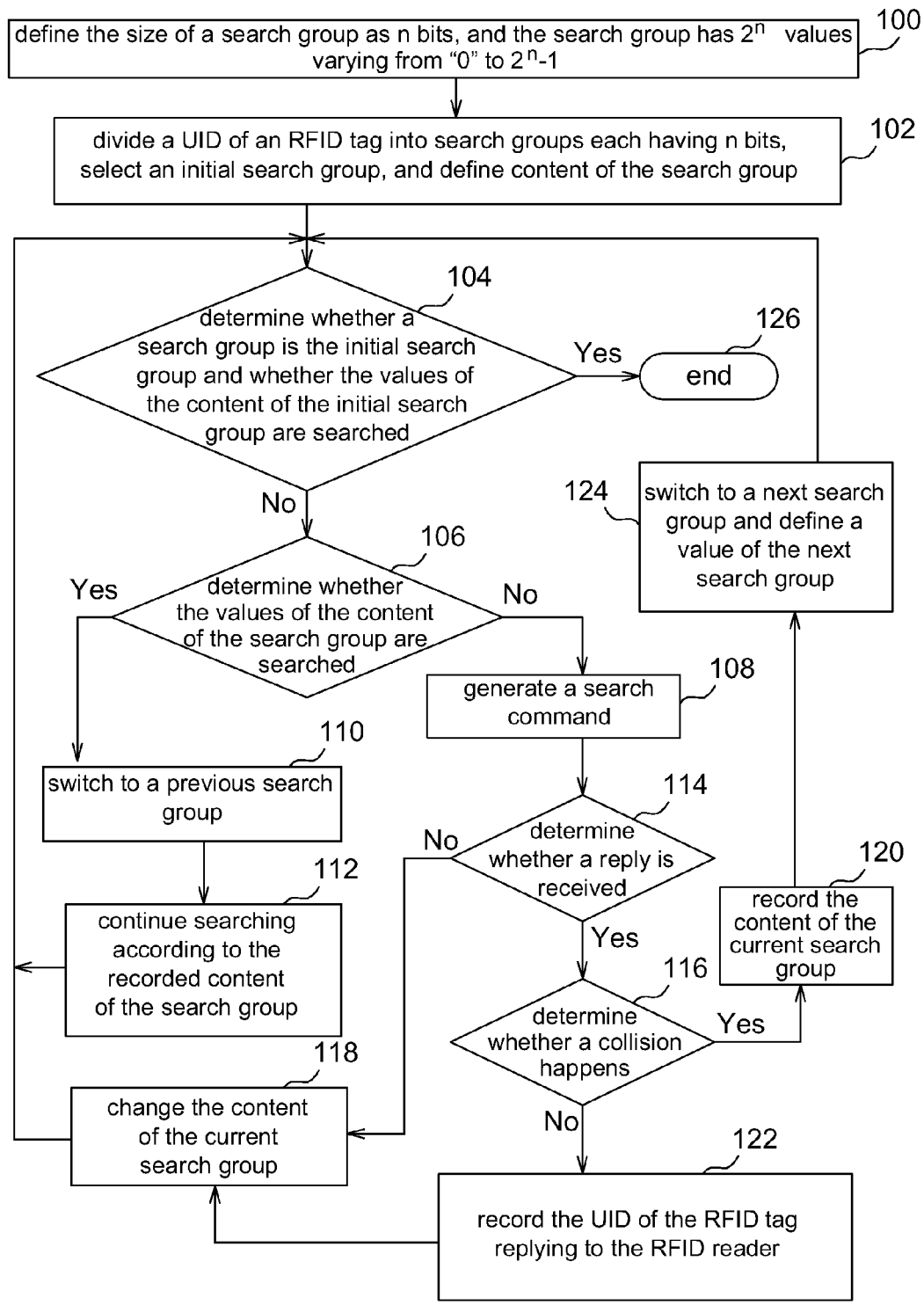
FIG. 4 is a flow chart of a method for searching a plurality of RFID tags in accordance with an embodiment of the present disclosure.

FIG. 4 shows a flow chart of a method for searching a plurality of RFID tags in accordance with the present disclosure. The method comprises steps below.

In Step 100, the size of a search group is defined as n bits, and the search group has $2^n$ values varying from "0" to $2^n-1$ represented in decimal form.

In Step 102, an RFID reader divides a UID of an RFID tag into multiple search groups each having n bits, selects an initial search group, and defines content of the search group.

In Step 104, it is determined whether a search group is the initial search group and whether the values of the content of the initial search group are searched. When the answer is yes, Step 126 is performed; otherwise, Step 106 is performed.

In Step 106, it is determined whether the values of the content of the search group are searched. When the answer is yes, Step 110 is performed; otherwise, Step 108 is performed.

In Step 108, a search command is generated, and Step 114 is performed.

In Step 110, the search flow continues by switching to a previous search group, and Step 112 is performed.

In Step 112, the search flow continues according to the recorded content of the search group, and Step 104 is performed.

In Step 114, it is determined whether a reply is received. When the answer is yes, Step 116 is performed; otherwise, Step 118 is performed.

In Step 116, it is determined whether a collision happens. When the answer is yes, Step 120 is performed; otherwise, Step 122 is performed.

In Step 118, the content of the current search group is changed, and Step 104 is performed.

In Step 120, the content of the current search group is recorded, and Step 124 is performed.

In Step 122, the UID, of the RFID tag, provided to the RFID reader in a reply, is recorded, and Step 118 is performed.

In Step 124, the search flow continues by switching to a next search group and a value of the next search group is defined, and Step 104 is performed.

In Step 126, the flow ends.

In conclusion, the method and apparatus thereof according to the present disclosure utilizes search groups each of which containing a plurality of bits. The bits are searched simultaneously, and UIDs of a plurality of RFID tags are identified after one search. The method and apparatus thereof defines that, when the UIDs of the RFID tags are the same with content of the search group currently interrogated by an interrogator, the RFID tags need to reply to a plurality of protocols of the interrogator. The disclosed embodiments solve the problem that only one UID of one of the plurality of RFID tags is identified at a time while bits are interrogated one after another in the conventional method. Moreover, the disclosed embodiments overcome a disadvantage of unsatisfactory flexibility that only one protocol is applicable at a time. Thus, the scheme for searching a plurality of RFID tags according to the present disclosure is effective and can be widely used.

While the disclosed embodiments have been described in terms of what is presently considered to be the most practical and preferred embodiments, it is to be understood that the disclosed embodiments need not be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. An RFID reader, for searching a plurality of RFID tags each having an UID composed of a plurality of bits, the RFID reader comprising:
    a control unit configured to divide the plurality of bits into a plurality of groups each having n bits, and select a first group from the groups and a first value for the first group, wherein n is a positive integer greater than 1;
    a communication protocol processing module, coupled to the control unit, configured to generate a search command according to the first group and the first value, wherein the RFID reader obtains a search result according to the search command and the UIDs of the RFID tags; and
    an analyzing module, coupled to the communication protocol processing module and the control unit, configured to generate a control signal to control the control unit of the RFID reader, and further configured to analyze the search result to determine whether at least one RFID tag corresponds to the first group and the first value, the analyzing module further configured to:
        generate the control signal having a first value in response to the search result indicating a collision due to more than one response from the RFID tags happens such that, according to the control signal, the control unit selects a group other than the first group from the groups, and
        generate the control signal having a second value in response to the search result indicating a response from one of the RFID tags such that, according to the control signal, the control unit selects a value different from the first value for the first group.

2. The RFID reader as claimed in claim 1, wherein the first group is one group, among the groups, having a most significant bit or a least significant bit of the plurality of bits.

3. The RFID reader as claimed in claim 1, wherein the first value is in a range from 0 to $2^n-1$, and wherein the control unit selects the first value according to a first predetermined sequence so that all values within the range can be selected.

4. The RFID reader as claimed in claim 3, wherein, when the search result indicates that the collision happens, the analyzing module records the first value when the collision happens and generates the control signal.

5. The RFID reader as claimed in claim 4, wherein the control unit increments or decrements the first value according to the control signal and the first predetermined sequence, selects a second group from the groups according to the control signal and a second predetermined sequence, and selects a second value for the second group.

6. The RFID reader as claimed in claim 5, wherein the second value is in a range from 0 to $2^n-1$, and wherein the control unit selects the first group and the first value again when the control unit further determines all values for the second value in the range have been selected.

7. The RFID reader as claimed in claim 3, wherein, when the search result indicates that no reply is generated, the analyzing module generates the control signal having a third value, and wherein the control unit increments or decrements the first value according to the control signal and the first predetermined sequence.

8. The RFID reader as claimed in claim 3, wherein, when the search result indicates that a reply is generated and no collision happens, the analyzing module records the reply and generates the control signal.

9. The RFID reader as claimed in claim 8, wherein the control unit increments or decrements the first value according to the control signal and the first predetermined sequence.

10. The RFID reader as claimed in claim 1, wherein the control unit ends a search procedure when the control unit further determines a value represented by n bits of the first group has been searched.

11. A method for searching a plurality of RFID tags each having a UID composed of a plurality of bits, the method comprising:
    dividing, by a control unit of an RFID reader, the bits into a plurality of groups each having n bits, wherein n is a positive integer greater than or equal to 1;
    selecting, by the control unit, a first group of the groups and a first value for the first group;
    generating, by a communication protocol processing module of the RFID reader, a search command according to the first group and the first value, wherein a search result is obtained according to the search command and UIDs of the RFID tags;
    analyzing, by an analyzing module of the RFID reader, the search result to determine whether at least one RFID tag corresponds to the first group and the first value;
    generating, by the analyzing module, a control signal to control the control unit of the RFID reader, the control signal having a first value in response to the search result indicating a collision due to more than one response from the RFID tags happens, such that the control unit selects a group other than the first group from the groups; and
    generating, by the analyzing module, the control signal to control the control unit of the RFID reader, the control signal having a second value in response to the search result indicating a response from one of the RFID tags, such that the control unit selects a value different from the first value for the first group.

12. The method as claimed in claim 11, wherein the first group is one group, among the groups, having a most significant bit or a least significant bit of the plurality of bits.

13. The method as claimed in claim 11, wherein the first value is in a range from 0 to $2^n-1$, and wherein selecting the first value comprises selecting the first value according to a first predetermined sequence so that all values within the range can be selected.

14. The method as claimed in claim 13, further comprising:
    when the search result indicates that a collision happens, recording the first value when the collision happens and generating the control signal.

15. The method as claimed in claim 14, further comprising:
    changing the first value according to the control signal and the first predetermined sequence;
    selecting a second group of the groups according to the control signal and a second predetermined sequence; and
    selecting a second value for the second group.

16. The method as claimed in claim 15, further comprising: selecting the first group and the first value again when it is determined the second value has been selected.

17. The method as claimed in claim 13, further comprising: generating the control signal having a third value when the search result indicates that no reply is generated; and changing the first value according to the control signal and the first predetermined sequence.

18. The method as claimed in claim 13, further comprising: recording a reply and generating the control signal when the search result indicates that the reply is generated and no collision happens; and changing the first value according to the control signal and the first predetermined sequence.

19. The method as claimed in claim 11, further comprising: ending a search procedure when it is determined a value represented by n bits of the first group has been searched.

\* \* \* \* \*